United States Patent [19]

Sukhman et al.

[11] Patent Number: 5,982,803
[45] Date of Patent: Nov. 9, 1999

[54] FREE-SPACE GAS SLAB LASER

[75] Inventors: Yefim P. Sukhman, Scottsdale; Mikhail E. Ryskin; Christian Julian Risser, both of Phoenix, all of Ariz.

[73] Assignee: Universal Laser Systems, Inc., Scottsdale, Ariz.

[21] Appl. No.: 08/842,157

[22] Filed: Apr. 23, 1997

Related U.S. Application Data

[62] Division of application No. 08/543,924, Oct. 17, 1995, Pat. No. 5,661,746.

[51] Int. Cl.$^6$ ...................................................... H01S 3/097
[52] U.S. Cl. ................................................................ 372/87
[58] Field of Search ........................................ 372/83, 87

[56] References Cited

U.S. PATENT DOCUMENTS

| | | |
|---|---|---|
| 3,593,189 | 7/1971 | Buhrer . |
| 3,763,442 | 10/1973 | McMahan . |
| 3,886,479 | 5/1975 | Pearson ..................................... 372/87 |
| 4,077,020 | 2/1978 | Anderson et al. .......................... 372/87 |
| 4,169,251 | 9/1979 | Laakmann . |
| 4,217,560 | 8/1980 | Kosyrev et al. ............................ 372/87 |
| 4,342,113 | 7/1982 | Iwata . |
| 4,363,126 | 12/1982 | Chenausky . |
| 4,373,202 | 2/1983 | Laakmann . |
| 4,383,203 | 5/1983 | Stanley . |
| 4,429,398 | 1/1984 | Chenausky . |
| 4,443,877 | 4/1984 | Chenausky . |
| 4,451,766 | 5/1984 | Angle . |
| 4,455,658 | 6/1984 | Sutter . |
| 4,493,087 | 1/1985 | Laakmann . |
| 4,563,763 | 1/1986 | Kuhn . |
| 4,589,114 | 5/1986 | Sutter, Jr. . |
| 4,596,018 | 6/1986 | Gruber . |
| 4,612,648 | 9/1986 | Peterson et al. . |
| 4,613,972 | 9/1986 | Bettman . |
| 4,631,449 | 12/1986 | Peters . |
| 4,672,620 | 6/1987 | Slusher . |
| 4,675,874 | 6/1987 | Pohler . |
| 4,679,202 | 7/1987 | Maloney . |
| 4,688,228 | 8/1987 | Newman . |
| 4,703,491 | 10/1987 | Lim . |
| 4,719,639 | 1/1988 | Tulip . |
| 4,748,634 | 5/1988 | Hesterman . |
| 4,779,284 | 10/1988 | Nissen . |
| 4,787,090 | 11/1988 | Newman . |

(List continued on next page.)

OTHER PUBLICATIONS

Team Company, Inc. Cold Wedling Information. Pinch–Off Systems, Precision Tools for Cold Welding. Aug. 1993.

Laakmann, Peter, "The Market Continues to Grow for Sealed Carbon Dioxide Lasers", *Industrial Laser Review*, Oct., 1993. pp. 9–12.

Morley, R.J., "Mode and Frequency Control of Compact $CO_2$ Slab Lasers Through Intra–Cavity Coherent Imaging". Applied Optics. vol. 34, No. 3, Jan. 20, 1995.

*Primary Examiner*—Rodney Bovernick
*Assistant Examiner*—Robert E. Wise
*Attorney, Agent, or Firm*—Donald J. Lisa

[57] ABSTRACT

A pair of elongated, parallel electrodes (91,92) are insulatively mounted within a tubular housing (111) filled with a laser gas mixture between an arrangement of reflective optical elements (120,150) sealingly mounted at each end of the housing. The electrodes form a rectangular gas discharge area (40) the minimum spacing (a) between which is the diameter of the fundamental free-space mode of the stable, laser resonator (17) formed in the gap when the electrodes are rf excited (13). A multi-pass optical configuration (30, 50) uses the full width (b) of the active medium to produce a high power, compact laser (10,200). Deformable support rings (97) are compressed to push the electrodes apart against small cylindrical spacers (99) abutting the inner walls of the housing to maintain the electrodes' spatial relationship. The rf feeds (103) sealingly (112) connected to the electrodes through the housing without disturbing the uniform distribution of forces on the electrodes. Air cooled heatsinks (161,162, 176,177) are held tightly against while being flexibly mounted to the laser tube assembly reducing mechanical and operational torsional distortion, misalignment and instability.

11 Claims, 10 Drawing Sheets

U.S. PATENT DOCUMENTS

| | | |
|---|---|---|
| 4,805,182 | 2/1989 | Laakmann . |
| 4,809,284 | 2/1989 | Chenausky . |
| 4,833,681 | 5/1989 | Akiyama . |
| 4,837,772 | 6/1989 | Laakmann . |
| 4,847,852 | 7/1989 | Yatsiv . |
| 4,852,109 | 7/1989 | Kuchar . |
| 4,856,010 | 8/1989 | Wissman . |
| 4,875,218 | 10/1989 | Hongo . |
| 4,891,819 | 1/1990 | Sutter, Jr. . |
| 4,893,353 | 1/1990 | Iwaoka . |
| 4,908,585 | 3/1990 | Chenausky . |
| 4,912,526 | 3/1990 | Iwaoka . |
| 4,928,756 | 5/1990 | Shull . |
| 4,930,136 | 5/1990 | Chaffee . |
| 4,953,172 | 8/1990 | Gurski . |
| 4,953,176 | 8/1990 | Ekstrand . |
| 4,969,153 | 11/1990 | Leyshon . |
| 5,008,894 | 4/1991 | Laakmann . |
| 5,048,032 | 9/1991 | Ekstrand . |
| 5,050,184 | 9/1991 | Nelson . |
| 5,065,405 | 11/1991 | Laakmann . |
| 5,113,407 | 5/1992 | Kobayashi . |
| 5,123,028 | 6/1992 | Hobart . |
| 5,131,003 | 7/1992 | Mefferd . |
| 5,135,604 | 8/1992 | Kumar . |
| 5,150,372 | 9/1992 | Nourrcier . |
| 5,151,916 | 9/1992 | Iehisa et al. . |
| 5,172,388 | 12/1992 | Long . |
| 5,216,689 | 6/1993 | Gardner . |
| 5,224,117 | 6/1993 | Kruger . |
| 5,251,223 | 10/1993 | Hiroshima . |
| 5,253,261 | 10/1993 | Chaffee . |
| 5,260,964 | 11/1993 | Morin . |
| 5,311,529 | 5/1994 | Hug . |
| 5,315,605 | 5/1994 | Nakazawa . |
| 5,335,242 | 8/1994 | Hobart . |
| 5,353,293 | 10/1994 | Shull . |
| 5,353,297 | 10/1994 | Koop . |
| 5,394,427 | 2/1995 | McMinn . |
| 5,412,681 | 5/1995 | Eisel . |
| 5,475,702 | 12/1995 | August . |
| 5,475,703 | 12/1995 | Scalise . |
| 5,479,428 | 12/1995 | Kuzumoto . |
| 5,528,613 | 6/1996 | Macken et al. ............... 372/87 |
| 5,549,795 | 8/1996 | Gregoire . |
| 5,586,134 | 12/1996 | Das . |
| 5,592,504 | 1/1997 | Cameron . |
| 5,600,668 | 2/1997 | Erichsen et al. ............ 372/87 |

FREE-SPACE GAS SLAB LASER

This is a division of Ser. No. 08/543,924 filed Oct. 17, 1995 now U.S. Pat. No. 5,661,746.

I. BACKGROUND OF THE INVENTION

A. Fields of the Invention

The present invention relates generally to coherent light generators of the gas discharge laser variety, and, more particularly, to a gas slab laser configured with an improved electrode structure and a multi-pass, non-waveguide, that is, free-space, resonator with improved heat transfer and cooling apparatus.

B. Discussion of Background and Prior Art

There has been a considerable investigation into various forms of waveguide and slab $CO_2$ lasers. Hobart U.S. Pat. No. 5,123,028 ("the '028 patent") at 1:9–3:13 (Citations are to column and line number).

1. In-Line, Non-Slab Gas Lasers

Most non-slab lasers, for example, K. Laakmann U.S. Pat. 4,169,251 ("the '251 patent") and P. Laakmann U.S. Pat. 4,805,182 ("the '182 patent") require a relatively large length to output power ratio. In a typical well known "in-line" configuration, e.g., the Laakmann '251 patent, a pair of elongated, insulated electrodes are disposed parallel to each other with radio frequency ("RF") excitation applied transverse to the laser light beam formed in the discharge zone between the electrodes and a reflective mirror at each end of the single-pass resonant cavity. In order to achieve a predetermined power intensity, the cavity has to be long to allow sufficient light amplification. Thus, the length to output power ratio is high. This configuration presents a practical problem in that the length of the laser determines the length of the outside equipment into which the laser is installed. Long laser equipment presents many obvious problems, limiting its use. E.g., the long laser equipment is not portable, cannot be used on desk tops, and is more expensive to build.

An additional problem with the in-line laser design using the metal-ceramic combination (Laakmann '251) is the uneven thermal expansion caused by the different coefficients of expansion of the metal electrodes and ceramic wall members which cause serious operational problems, including a mechanical instability and misalignment resulting from deformation of the laser tube.

While the P. Laakmann '182 configuration improved the K. Laakmann '251 design by introducing the advantage of similar materials, i.e., the all metal design, it did not solve the problems associated with the relative high length to output power ratio of the in-line design.

Accordingly, it is a primary object of the present invention to provide a compact laser configuration and resonator design which provides a low length to output power ratio, thereby enabling flexible design and many additional laser uses.

Accordingly, it is a further object of the present invention to provide an improved cooling system mounting structure and heatsink design which eliminates distortion of the laser tube and the resulting mechanical and operational instability and misalignments.

A still further problem with the in-line design of the prior art, e.g., the Laakmann '251 and '182 patents, is the "waveguide effect". Reflections of light from the surfaces of the electrodes and from the walls of the dielectric members, adjacent the discharge zone due to the close proximity of those surfaces which form a constrained symmetrical bore in the discharge zone, cause a non-uniform distribution of the energy in the beam in the near field making it unacceptable for a variety of applications. While this problem may be corrected by using the more uniformly distributed far field beam or filtering techniques, such solutions are not always available or practical, and, at the least, add significant costs. In a compact laser design with limited space between the laser output optics and the focusing optics such solutions are not optimal.

Accordingly, it is a further object of the present invention to provide a free-space, in all directions, gas laser design which provides substantially uniform energy distribution in both the near and far fields thereby further reducing the cost and simultaneously enhancing the utility of the compact laser design.

2. Slab Waveguide Lasers

Slab waveguide lasers have been known for some time. An early gas slab laser design is shown in Tulip U.S. Pat. 4,719,639 ("the Tulip '639 patent"). A more recent design is shown in Hobart U.S. Pat. No. 5,123,028 ("the Hobart '028 patent").

The main advantage of slab waveguide lasers is their ability to generate high power in a short active medium. This capability derives from the fact that slab waveguide lasers have a discharge area that is typically rectangular in cross section enabling the use of the full available width of the active medium to achieve greater overall output power.

However, it is this very use of two different types of resonators that produces the main disadvantage of slab waveguide lasers of the prior art, i.e., inherently lower overall beam quality than the in-line design lasers. P. Laakmann, "The Market Continues to Grow for Sealed Carbon Dioxide Lasers", *Industrial Laser Review*, October, 1993. This deficiency can only be corrected through the use of complex and relatively expensive optical systems. The resulting beam of such a hybrid gas slab laser has different properties in different directions. In the narrow direction, the electrode surfaces create a waveguide effect. In the wide direction, there is no physical restriction, and the beam is formed as in a free-space laser resonator. The result is greater divergence of the beam after it leaves the laser along the waveguide axis (narrow dimension) than along the non-waveguide axis (wide dimension). Hobart '028, FIG. 19. (corrected for obvious clerical errors). However, this low beam quality is partially correctable, but only through the use of complex optical systems which are relatively expensive. Accordingly, it is an object of the present invention to provide a high efficiency, high power gas slab laser which uses the free-space, non-waveguide, stable resonator in both directions producing a high quality uniform beam and eliminating the need for complex optics.

Folded type gas lasers are also not new. Laakmann '182 FIGS. 5–6. Recent gas slab waveguide lasers have also utilized folded designs to achieve greater power in shorter lasers. Koop U.S. Pat. No. 5,353,297 ("the '297 patent"). The Koop '297 patent teaches a hybrid resonator design which is operating as a stable waveguide in the narrow axis and a negative branch unstable resonator in the wide axis. Additionally, Koop adds a pair of mirrors at each end of the electrodes to create a folded beam path in the wide axis. Koop, therefore, exemplifies the problems described above. Accordingly, it is an object of the present invention to provide a compact, gas slab laser which uses a simple, inexpensive, multi-pass, optical system with the laser light beam operating in a non-waveguide mode in all directions in the resonator discharge cavity.

Another problem in gas slab laser design is the supporting structure for positioning the electrodes within the laser tube to maintain a predetermined gap between the electrodes in insulated relation to the walls of the housing with minimal capacitance and good thermal conductivity. The electrode gap dimension is critical to optimal laser operation. The spacing between the electrodes and housing is critical to properly balance maximum heat transfer (small spacing desired) and maximum inherent capacitance of the structure for high quality RF matching (large spacing desired). Accordingly, it is an object of the present invention to provide an improved electrode support structure and housing wall spacing configuration which optimizes the operating parameters of the laser.

II. SUMMARY OF THE INVENTION

Set forth below is a brief summary of the invention in order to achieve the forgoing and other benefits and advantages in accordance with the purposes of the present invention as embodied and broadly described herein.

One aspect of the invention is a gas slab laser having a gas containment structure, a pair of parallel, electrically insulated electrodes mounted in the gas containment structure and forming a gas discharge area having a rectangular cross section, a laser gas mixture sealed in the gas containment structure, an RF feed terminal coupled to each electrode and adapted to couple to a source of RF-excitation, and an arrangement of reflective optical elements mounted to opposite ends of the gas containment structure adapted to form a laser resonator, the minimum distance between the electrodes being not less than the maximum cross-sectional size of a fundamental mode of a stable laser resonator beam operable substantially in free-space in any direction within the rectangular cross section.

In a further feature of this aspect of the invention each electrode is an elongated, T-shaped electrode made of anodized aluminum having an aluminum oxide coating in the range of about 0.025–0.01 mm.

A further feature of this aspect of the invention includes the gas containment structure having an aperture through which the RF terminal extends with a clearance fit, and an o-ring compressed between the electrode, the RF terminal and the gas containment structure to seal the gas containment structure without applying any substantial force to the electrode.

Further features of this aspect of the invention include at least one optical element with a concave reflective surface, an output coupler which is partially reflective, and a multi-pass laser resonator having at least two optical elements, one of which is a partially reflective optical element with a coefficient of reflection which is a function of the number of passes in the multi-pass resonator.

Still another feature of this aspect of the invention is an arrangement of optical elements which includes an optical assembly at each end of the gas containment structure wherein each optical assembly further includes an end plate closing the end of the gas containment structure having an aperture therein, a first support plate secured to the end plate at a pivot point, at least one reflective mirror affixed to the first support plate and aligned with the aperture in the end plate to receive and reflect light from the discharge area, an o-ring compressed between the end plate and the first support plate sealing the gas containment structure, the first support plate being adjustable about a vertical axis by a screw in a horizontal plane with the pivot point and about a horizontal axis by a screw in a vertical plane with the pivot point.

In still another feature of this aspect of the invention one of the optical assemblies is at the front end of the gas containment structure and includes a second support plate having an aperture therein and secured to the first support plate at a pivot point, a second reflective mirror affixed to the second support plate and aligned with the aperture therein to receive and reflect light from the discharge area and to transmit light outside the gas containment structure, an o-ring compressed between the first support plate and the second support plate sealing the gas containment structure, the second support plate being adjustable about a vertical axis by a screw in a horizontal plane with the pivot point and about a horizontal axis by a screw in a vertical plane with the pivot point.

A second aspect of the invention is a plurality of rigid, deformable support members mounted between the electrodes for maintaining the spatial relationship of the electrodes.

A further feature of this aspect of the invention is each deformable support member may be made of anodized aluminum and includes a ring, and a screw engaging opposite sides of the ring for compressing the opposite sides in one direction to spread the electrodes in another direction until the electrodes are firmly secured within the containment structure.

A further feature of this aspect of the invention is a plurality of short cylindrical spacers with a small cross-section maintaining the electrodes in spaced relation to the inner walls of the gas containment structure while providing minimal capacitance.

A third aspect of the invention includes each electrode having a large surface portion supported in close proximity to the inner wall of the gas containment structure to facilitate heat transfer, a pair of elongated heatsinks contiguous those outer surfaces of the gas containment structure which are adjacent the large surface portions of the electrodes inside the gas containment structure, a pair of cover plates each of which is secured to each heatsink, and a plurality of flexible spacers between the cover plates and the gas containment structure, the heatsinks and cover plates forming a flexible enclosure surrounding the gas containment structure allowing uniform heat transfer while eliminating thermal expansion forces tending to deform the gas containment structure.

A further feature of this aspect of the invention includes the heatsinks having a plurality of threaded holes, and the cover plates having a plurality of countersunk holes offset slightly inwardly from the threaded holes, whereby when the cover plates are secured to the heatsinks by screws through the countersunk holes, the heatsinks are drawn snugly against the gas containment structure surfaces while the o-rings are compressed and position the cover plates in close spaced relation to the gas containment structure.

A fourth aspect of the invention is an assembly of electronic components mounted on the flexible enclosure and coupled to the RF terminals, and a fan assembly covering each heatsink forming a plurality of air channels for removing heat from the gas containment structure and electronic components.

A further feature of this aspect of the invention includes a hollow tube disposed within each heatsink for passing coolant liquid therethrough for removing heat from the gas containment structure.

Other aspects of the present invention will be understood by reading the detailed description of the invention below.

A gas laser designed as a free-space slab laser according to the present invention has the following advantages:

1. A compact construction with a small length to power ratio enabling portability of the laser and substantially enhanced utility;
2. A flexibly mounted heatsink assembly which eliminates torsional deformation and provides improved mechanical and operation stability.
3. A favorable geometric configuration which enables a rugged, very high density final package thereby substantially reducing the overall size and cost;
4. In a multi-pass configuration, the near field distribution of energy in the laser beam is substantially uniform, allowing laser beam focusing in the near proximity to the laser output coupler;
5. The ability to generate in a multi-pass configuration a symmetrical Gaussian beam with equal divergence in all directions within the beam cross section thereby facilitating the use of a simple beam delivery system.
6. An efficient thermal conductivity and heat transfer design which provides improved operational stability.

IV. DETAILED DESCRIPTION OF THE PREFERRED EMBODIMENT

Figure 1:
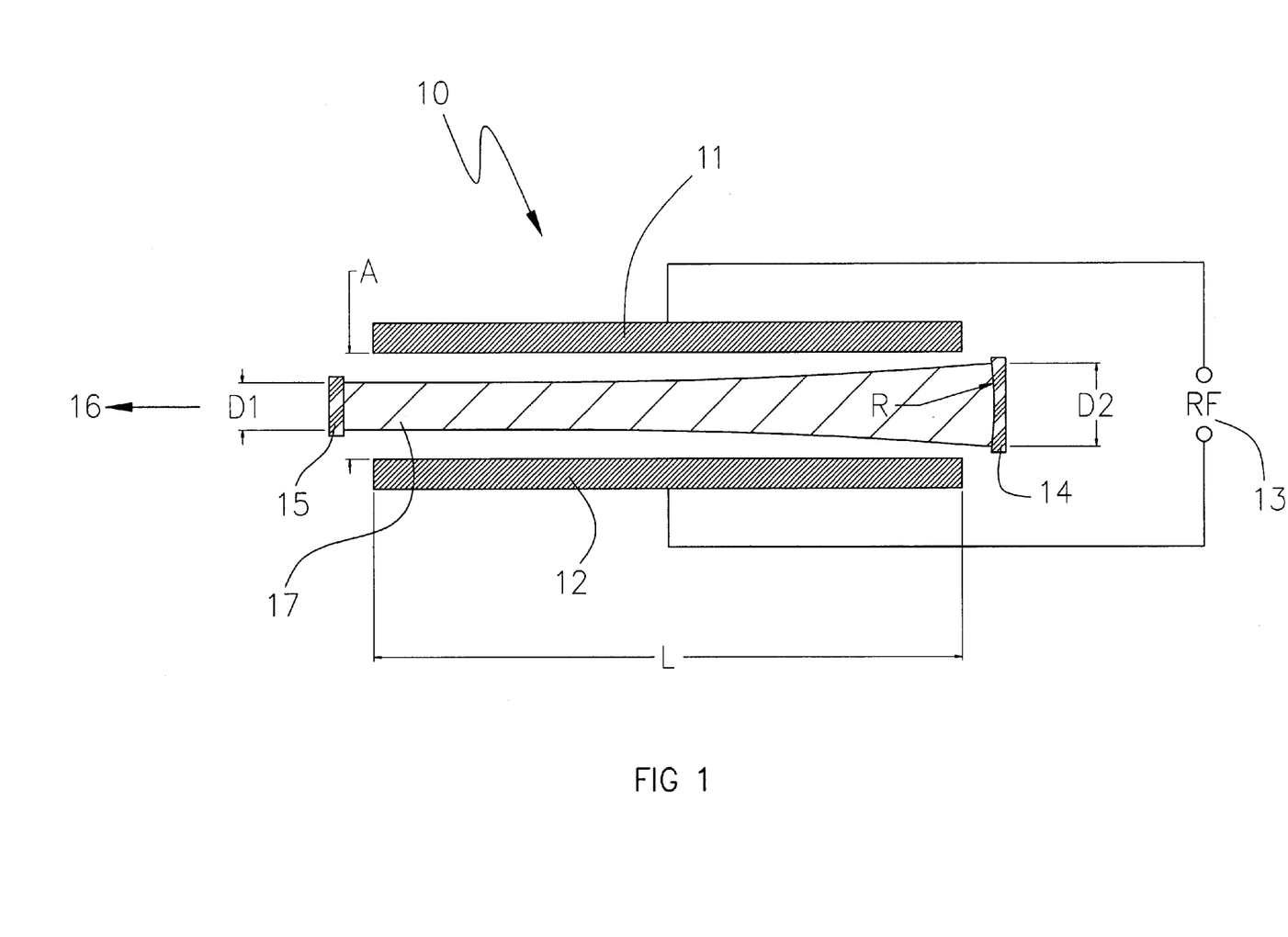
FIG. 1 is a schematic representation of the spatial relationship between the diameter of the Gaussian beam of the fundamental mode and the electrodes inside of the free-space slab laser of the present invention configured as a stable resonator in both directions.

A. Free-Space Gas Slab Laser Of The Present Invention With Multi-Pass Resonator The approach of the present invention, as initially seen in partial schematic form in FIG. 1, is to use a gas slab laser 10 with a stable resonator and to use the fundamental mode of the stable resonator. The result is the definition of a new type of a gas slab laser which is a non-waveguide, i.e., free-space, laser in both directions.

As seen in schematic form in FIG. 1, the gas slab laser includes a pair of parallel, elongated electrodes 11,12 defining a discharge area of height "a" and length "l" at the respective ends of which are reflective mirrors 14,15 of diameters d2, d1, respectively. The Gaussian beam 17 represents the fundamental mode of the stable slab laser resonator established in the discharge area when RF excitation 13 is applied. Mirror 15, the output coupler, is only partially reflective emitting laser light beam 16.

The parameters of the resonator and the size of electrodes are chosen as follows: the diameter of the fundamental mode of the resonator 10 should be less than the distance "a" between electrodes 11,12. For example, if the length of the slab is 500 mm, the output coupler is flat and the total reflector has a 4.0 m radius of curvature, then the outside diameter of the fundamental mode (near the curved mirror) is about 4.5 mm. So if we choose the distance between electrodes a=5.0 mm, and use the output coupler clear aperture of the same size—5.0 mm, then that laser can produce the fundamental mode. See FIG. 1.

Figure 2:
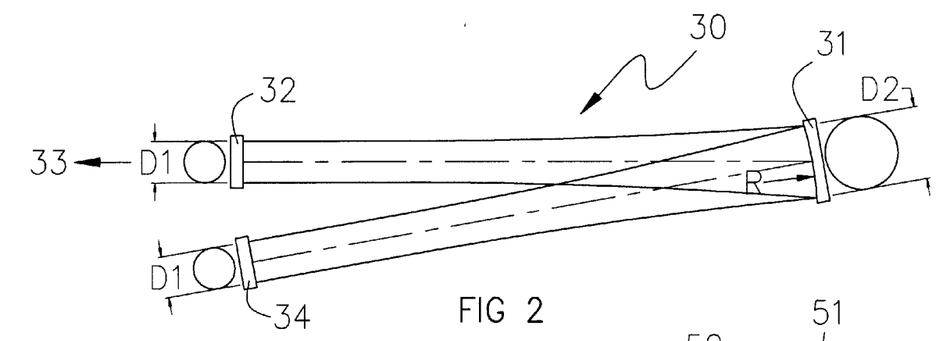
FIG. 2 is a side (as seen in FIG. 6) schematic representation of the beam trajectory inside a stable, free-space, two-pass resonator of the present invention.

In this case, however, the efficiency of utilizing the entire volume of active medium in the discharge area will be very low (e.g. about 30% if the width "b" of the slab (measured perpendicular to the paper in FIG. 1) where b=15 mm). To increase the utilization efficiency of the active volume of the discharge area, we use a multi-pass resonator 30,50 (see FIGS. 2,3). In FIG. 2 this resonator 30 includes three mirrors: concave back-end mirror (total reflector) 31 and two front flat mirrors 32,34—one, the output coupler (a partially reflecting mirror) 32, and the other, an intermediate flat mirror (a total reflector) 34. The surface of the output coupler 32 is placed perpendicular to the optical axis of the system, the back mirror 31 and intermediate mirror 34 being slightly angled relative to the optical axis of the system so that the trajectory multi-pass reflection of the laser beam goes from mirror 32 then to mirror 31 from which it is reflected to mirror 34 from which it is reflected back to mirror 31 and then back to mirror 32 in a multi-pass (two-pass) traverse of the active medium. The mirrors 31,32,34 are aligned so that after a number of reflections from the mirrors, the beam returns to its initial position on the surface of the output coupler and portion 33 is emitted. In this case the efficiency of the medium utilization is close to 90%.

Figure 3:
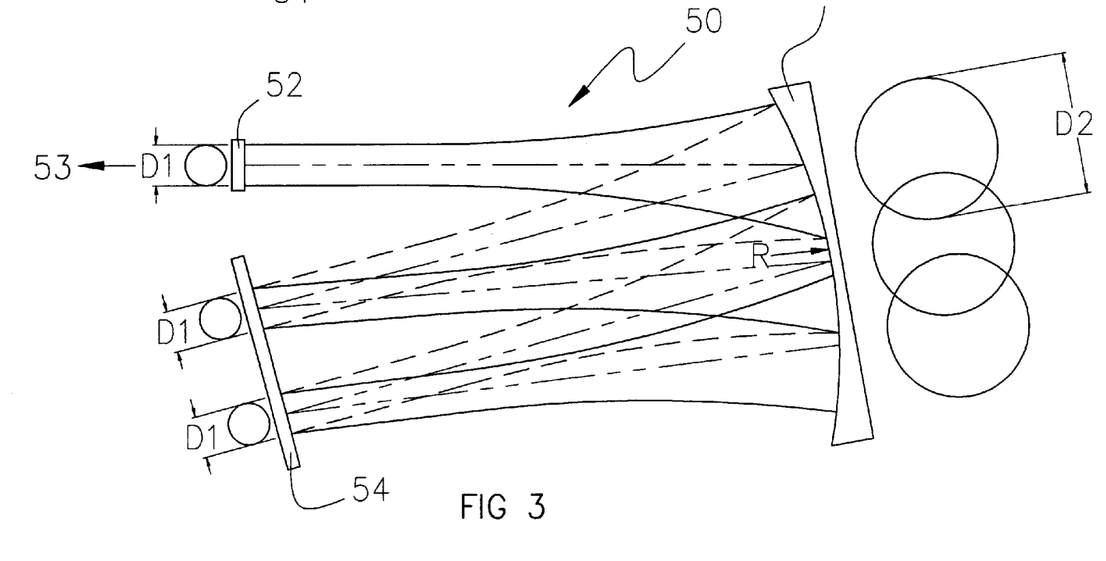
FIG. 3 is a side (as seen in FIG. 6) schematic representation of the beam trajectory inside a stable, free-space, five-pass resonator of the present invention.

In FIG. 3, resonator 50 operates similarly to resonator 30 of FIG. 2, except that the number of passes changes from two (FIG. 2) to five and depends on the width "b" of the electrodes. Output coupler 52, emitting light beam 53, is partially reflective while back mirror 51 and intermediate mirror 54 are fully reflective. If a=5.0 mm, b=15 mm, then it has been found that the optimal number of passes is five. In this case output power is a maximum. If a=7 mm, b=21 mm, the distance between mirrors is 500 mm and the radius of curvature of the rear mirror is 4 m, then the optimal number of passes is eight or nine (not shown). It is important to note that if the output coupler 32,52 and intermediate mirror 34,54 are flat (or they have the same radius of curvature), then the structure of the output mode is the same as in the case of one pass and does not depend on the number of passes. The number of passes changes only the optimal reflection of the output coupler: the greater the number of passes the greater the overall gain, and, thus, the less the optimal coefficient of reflection of the output coupler in order to obtain the optimum power output. For example, for the single-pass resonator mentioned above, the optimum reflectivity is about 92%, whereas for the five-pass resonator mentioned above the optimum reflectivity is about 70%.

B. Electrode-Spacers Sub-assembly

Figure 4:
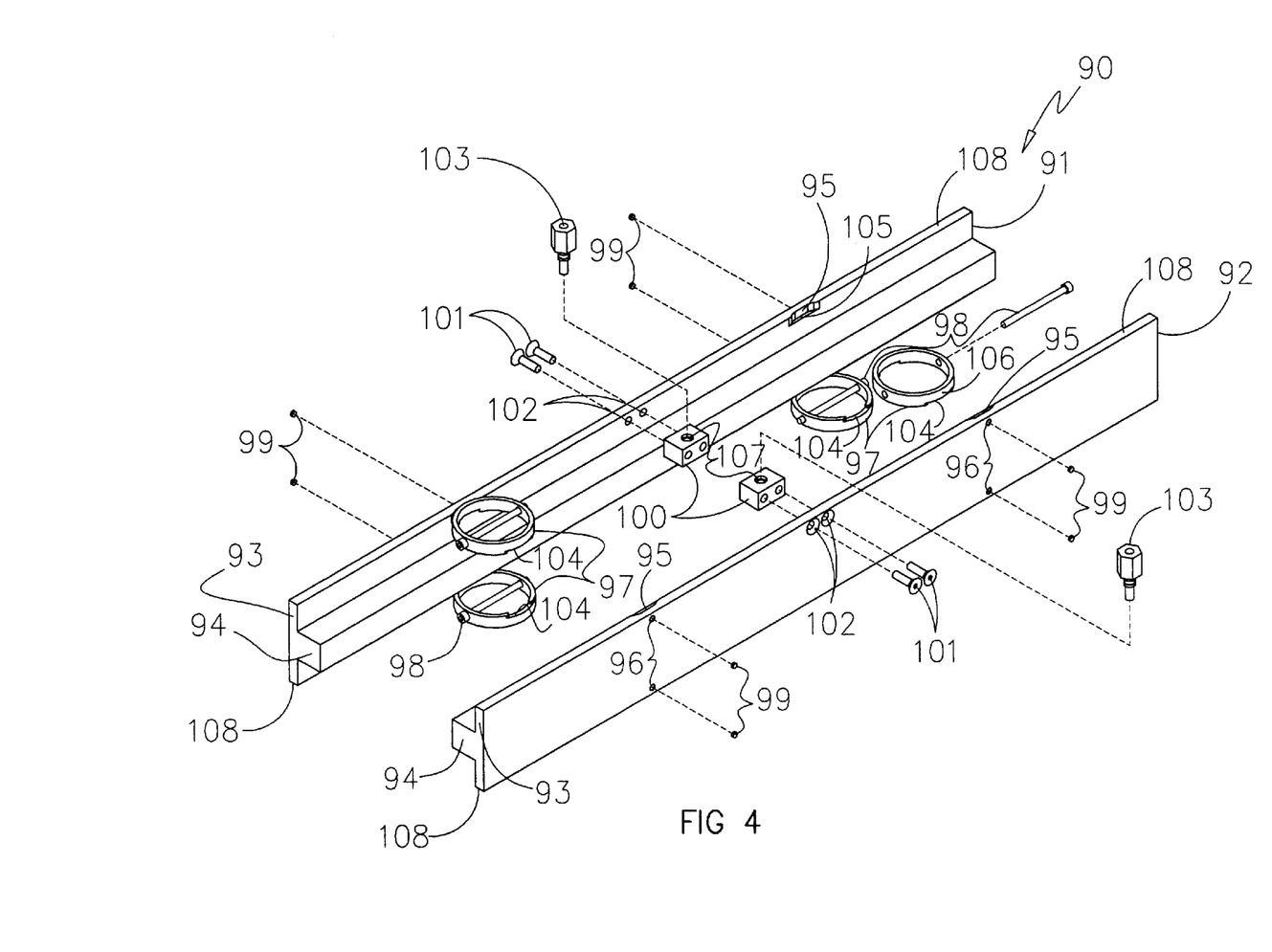
FIG. 4 is an exploded perspective view of the electrodes, supports and spacers sub-assembly for the free-space, slab laser configuration of the present invention.

As best seen in FIG. 4, the electrode spacer sub-assembly 90 of the present invention includes two electrodes 91,92 each of which has in cross section a T-shape comprising upright flat flange portions 93 and inwardly extending rectangular stem portions 94. The electrodes are made of aluminum having a thick insulative, hard, anodized coating of aluminum oxide in the range of 0.025 mm–0.01 mm thick. On the inboard side of the vertical flange portion 93 of each electrode are a pair of recesses 95 at the top portion of flange 93 and a pair of recesses 95 at the bottom portion of flange 93. Each recess has a flat bottom edge 105. On the outboard side of the vertical flange portion 93 of each electrode are pairs of recesses 96 located about one quarter of the distance from each end of each electrode. Each recess of the pair of recesses 96 are spaced apart from each other so that they are close to the top and bottom outboard edges of each electrode 91,92 to stabilize the electrode mounting.

When the electrodes are brought toward each other for assembly, a support ring 97 is fitted into each pair of opposing recesses 95 and functions as a deformable support member used to achieve the predetermined optimal spacing between the electrodes 91,92. Support members 97 are deformable rings. Each member 97 is physically deformed by turning screw 98 which deforms ring 97 by compressing opposing sides of the ring and thereby forcing the electrodes 91,92 apart outwardly and forcing spacers 99 (described below) outwardly against their respective inside walls of the tube 111. In this manner the predetermined optimal spacing between the electrodes is obtained at the upper and lower ends thereof and at the front and rear ends thereof as viewed in FIGS. 4,6, and the electrodes 91,92 are firmly and symmetrically supported within tube 111. Rings 97 are preferably made of aluminum and are also covered by an insulative, hard, anodized aluminum oxide coating. An alternative material such as stainless steel may also be used.

Figure 6:
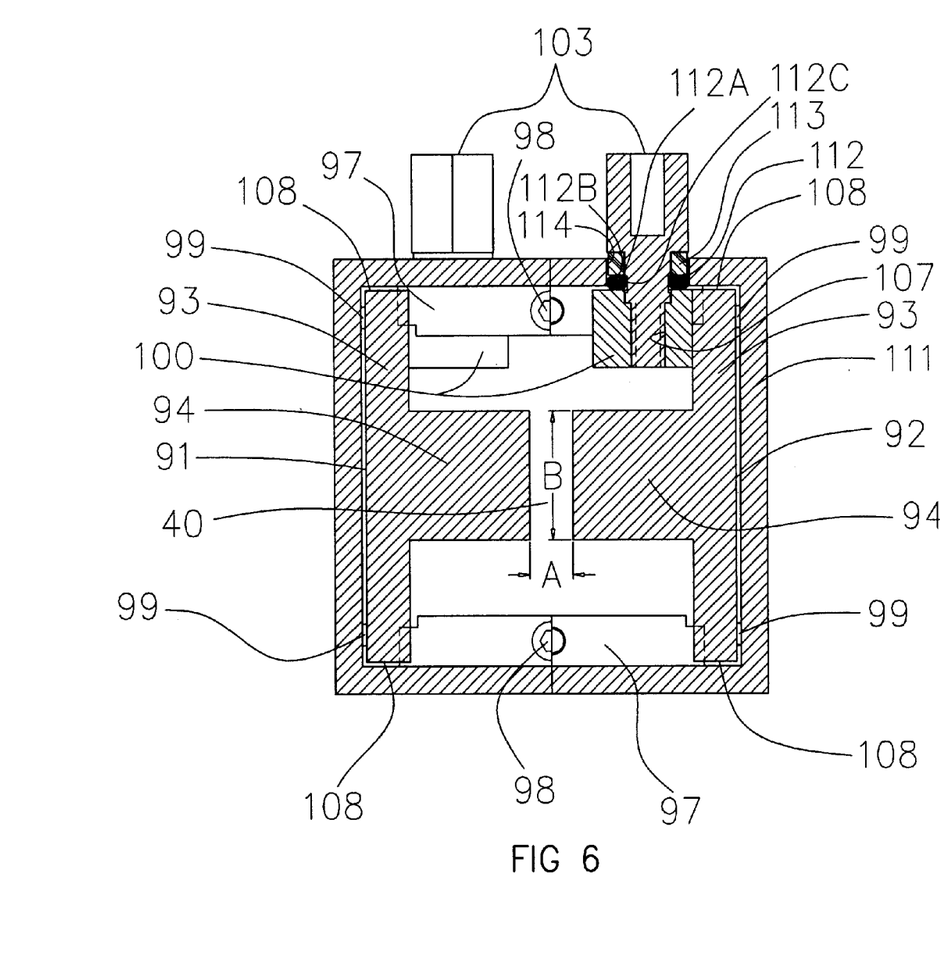
FIG. 6 is a cross sectional view taken along the lines 6—6 of FIG. 5.

Little cylindrical spacers 99 are fitted into the pairs of recesses 96 on the outboard sides of electrodes 91,92 and establish a predetermined spacing between the outboard surface of the vertical flanges 93 of electrodes 91,92 and the inboard surfaces of the tube 111 (FIGS. 4,6). The cylindrical spacers 99 may have alternative shapes, such as, a ball or washer. The spacers 99 are preferably made from aluminum and may also have a hard, anodized, aluminum oxide coating. Alternative materials include ceramic or stainless steel.

RF feed mounting blocks 100 are secured to the upper inboard sides of the electrodes 91,92 by mounting screws 101 through holes 102 and connect to RF terminals 103 which connect with the RF supply and which insulatively extend through the upper wall of tube 111. As described more fully below, the RF feeds also maintain the vacuum integrity of the tube 111 through a gas-tight seal effected therewith.

As best seen in FIG. 6, when the electrode-spacer assembly 90 is assembled inside tube 111, with spacers 99 in place in recesses 96 and support rings 97 supported in recesses 95, screws 98 are turned clockwise to deform rings 97 forcing electrodes 91,92 apart and cause spacers 99 to be held firmly in their recesses and against the inner walls of the tube 111 thereby laterally positioning the electrodes within the tube and having a gap 40 of predetermined narrow dimension "a". Rings 97 also have recesses 104 (FIG. 4) cut into their inboard edges such that the adjacent circumferential portions 106 of rings 97 fit into recesses 95 and overly the bottom edge 105 (FIG. 4) of recesses 95. The vertical height of the adjacent circumferential portions 106 of rings 97 (FIG. 4) is of a predetermined height so as to extend above the top and bottom edges 108 of electrodes 91,92 providing a predetermined top and bottom spacing of the electrodes 91,92 from the inner top and inner bottom walls of tube 111 (as seen in FIG. 6) thereby vertically positioning the electrodes 91,92 within tube 111. In this manner the electrodes are positioned very close to, but insulatively spaced from, the inner walls of the tube 111. The preferred electrode-wall spacing is 0.5 mm. By keeping the spacing between the electrodes and the tubes controlled (the larger the spacing, the smaller the capacitance), the electrode-tube inherent capacitance is kept at a minimum and does not interfere with the rapid initial excitation of the electrodes by the RF power source. On the other hand, the smaller the spacing, the greater the thermal conduction. The close proximity of the long flat outboard surfaces 93 of the electrodes to the inner walls of the tube 111 provide good thermal conductivity. The laser gas mixture is also selected to be rich in helium, a good thermal conductor. Accordingly, there is an optimal balance between material, spacing and gas in order to provide rapid start up of the laser and rapid removal of heat from the discharge area 40 thereby contributing significantly to the cooling of the apparatus during operation.

The above construction assures a gap 40 of narrow dimension "a" and wide dimension "b" (FIG. 6) and length "l" as shown in schematic form in FIG. 1.

C. Laser Tube Sub-assembly

Figure 5:
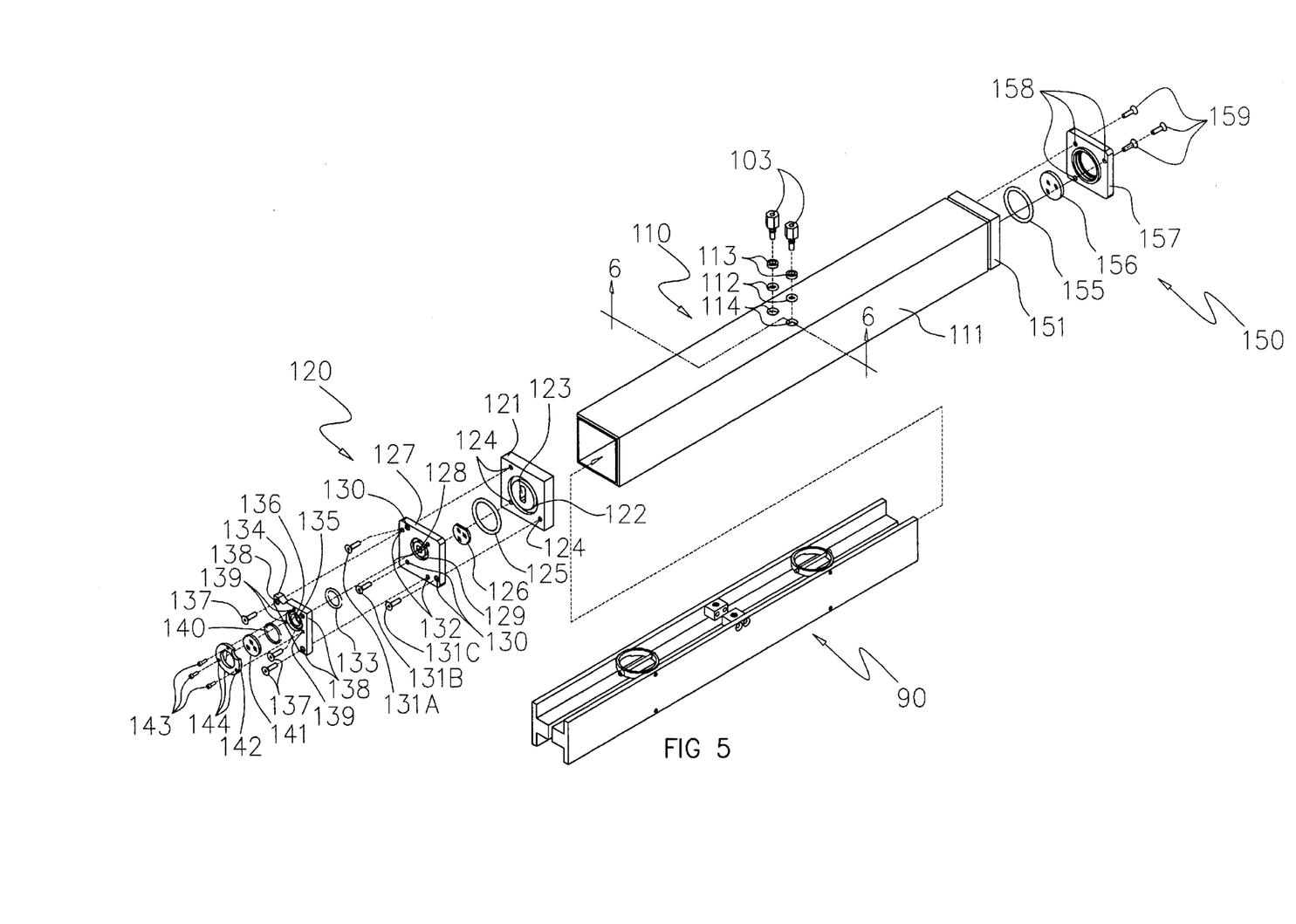
FIG. 5 is an exploded perspective view of the laser tube sub-assembly of the present invention.

As seen in FIG. 5 the laser tube sub-assembly includes the electrode spacers sub-assembly 90 of FIG. 4, the tube 111, the front dual mirror mount sub-assembly 120 and the rear mirror mount sub-assembly 150. Each of these sub-assemblies not previously discussed will be described further below.

Laser tube sub-assembly 110 is assembled first by inserting electrode-spacers sub-assembly 90 within tube 111 and turning screws 98 clockwise to firmly secure electrode-spacers sub-assembly 90 within tube 111 in symmetrical, spaced relation to the inner walls of tube 111 as described above. RF feed terminals 103 are inserted through spacers 113 and insulative O-rings 112 and screw into corresponding threaded holes 107 atop RF feed mounting blocks 100 thereby further securing electrode-spacers sub-assembly 90 within tube 111 adapted for connection to the RF supply 13.

As more clearly seen in FIG. 6, when terminal 103 is screwed into threaded hole 107, spacer 113 moves inwardly and presses O-ring 112 against the top surface 112*a* of RF feed mounting block 100. O-ring 112 compresses and forms a seal against the inside wall 112b of the hole 114 in tube 111 and also against the outside diameter of the recess 112c of terminal 103. The seals are formed without putting any lifting force on the electrodes 91,92 due to the clearance fit between terminal 103 and spacer 113 in hole 114. Thus, the forces on electrodes 91,92 remain uniformly distributed.

1. Front Dual Mirror Mount Sub-assembly

As viewed in FIG. 5, the front dual mirror mount sub-assembly 120 is first sub-assembled before it is sealingly attached to close the front of tube 111. The sealing attachment of front mirror sub-assembly 120 to the front end of the tube 111 (and also the sealing attachment of rear mirror sub-assembly 150 to the rear end of tube 111) is preferably done by welding. However, it may also be accomplished by use of epoxy compound or an O-ring compressed by a screwed mounting.

Figures 9, 10:
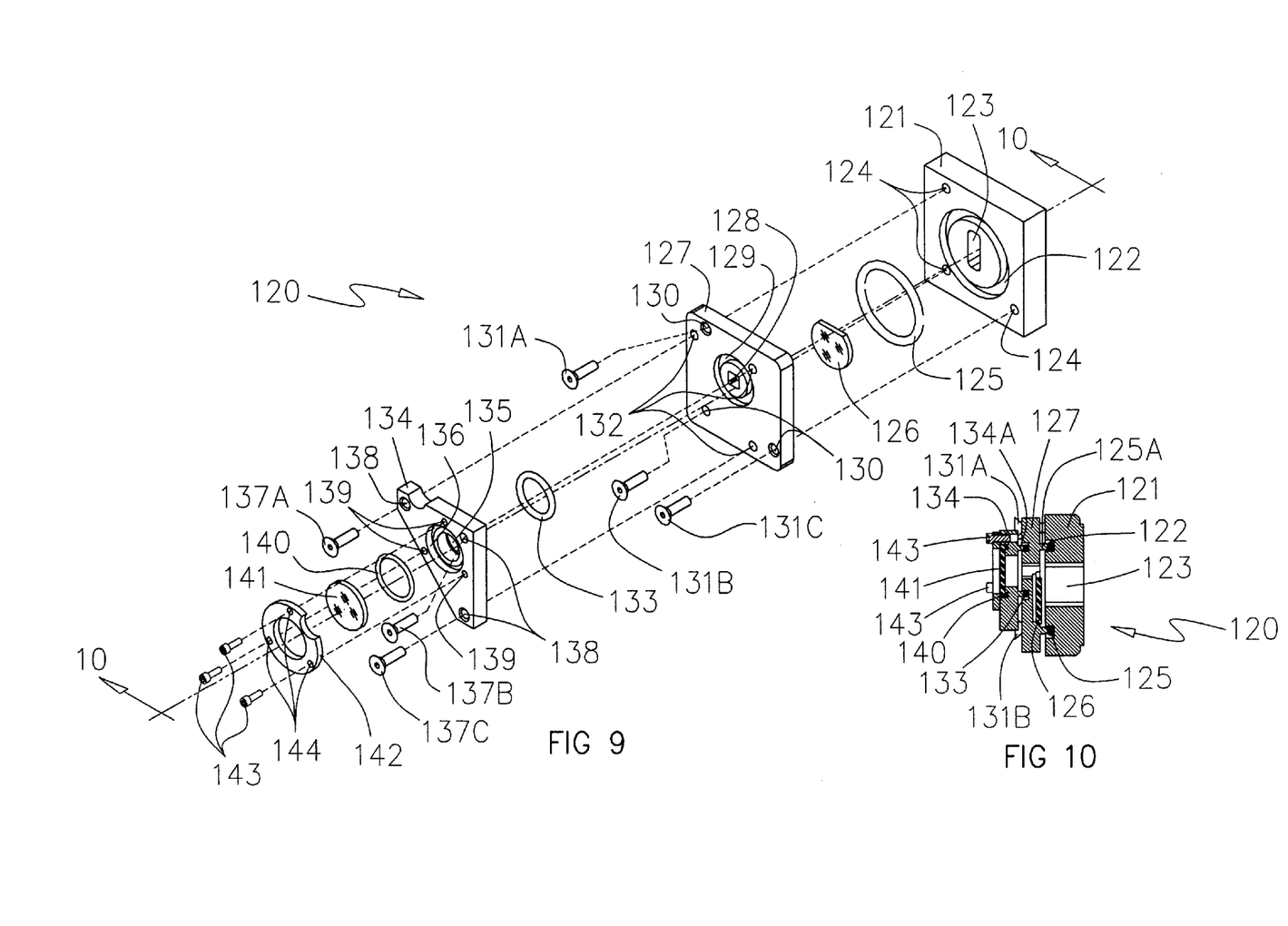
FIG. 9 is an exploded perspective view of the adjustable mirror assembly on the front of the slab laser of the present invention of FIG. 5.
FIG. 10 is a cross sectional view of the front mirror mount assembly taken along the lines 10—10 of FIG. 9.

As best seen in FIGS. 5,9,10 front mirror mount subassembly 120 includes front end plate 121 having an O-ring recess 122 adapted to receive intermediate plate O-ring 125 therein and having rectangular beam aperture 123 therein corresponding substantially to the gap 40 between electrodes 91 and 92.

Intermediate mirror support plate 127 is secured to tube front end plate 121 via three adjusting screws 131a, 131b and 131c inserted through corresponding mounting holes 130 in support plate 127. Screws 131a, 131b and 131c are screwed into threaded holes 124 in front end plate 121 with annular ring 125a pressing against O-ring 125 in recess 122 forming a gas tight seal therebetween. (FIG. 10). At the same time, intermediate mirror 126 is captured in a recess in the inboard side of intermediate mirror support plate 127 (FIG. 10). Screws 131a and 131c are orthogonal relative to screw 131b.

Mirror 126 is a totally reflector and is adjusted in a vertical plane about a horizontal axis via adjustment screw 131a. Mirror 126 is adjusted in a horizontal plane about a vertical axis via adjustment screw 131c. Adjustments by rotating screws 131a, 131c, cause intermediate mirror support plate 127 to fulcrum in its respective plane about the point of attachment by fixed pivot screw 131b. O-ring 125 is respectively depressed as adjustments are made to 131a, 131c without breaking the seal.

Intermediate support plate 127 has a central aperture 128 and an output coupler bracket O-ring recess 129 on its outboard side. Also formed therein are triangulated or orthogonal output coupler bracket screw holes 132. The output coupler 141 is mounted to the intermediate mirror support plate 127 using a triangular shaped output coupler bracket 134. Bracket 134 is mounted against intermediate mirror support plate 127 such that annular ring 134a on the inboard side of output coupler bracket 134 (FIG. 10) presses against output coupler bracket O-ring 133 in recess 129 of support plate 127 making a gas tight seal therebetween. Output coupler bracket 134 has central aperture 135 therein and, on its outboard side output coupler O-ring recess 136 to receive the output coupler O-ring 140 therein. Output coupler 141 is secured to the outboard side of output coupler bracket pressing against O-ring 140 by retainer 142 (FIG. 10) which is secured to the output coupler bracket 134 via the output retainer screws 143 mounted through holes 144 in the retainer 142 and screwed into threaded holes 139 in output coupler bracket 134. Output coupler bracket 134 is secured to intermediate mirror support plate 127 by adjustment screws 137a, 137b, 137c which extend through output coupler mounting screw holes 138 and are secured in the threaded output coupler bracket screw holes 132 on the outboard side of intermediate support plate 127. Screw 137b forms a fixed pivot point and screws 137a, 137c are orthogonal thereto allowing adjustment in a vertical plane about a horizontal axis via screw 137c and in a horizontal plane about a vertical axis via adjustment screw 137a. O-ring 133 is respectively compressed thereby allowing the output coupler 141 to be adjusted perpendicularly to the optical axis of the system.

As is well known in the art, alternative optical configurations are possible. One such alternative embodiment would combine the partially reflective, partially transmissive function of the output coupler mirror 141 with the totally reflective function of the intermediate mirror 126 into a single mirror, for example, having upper and lower portions dedicated to those separate functions.

2. Rear Mirror Mount Sub-assembly

Figures 11, 12:
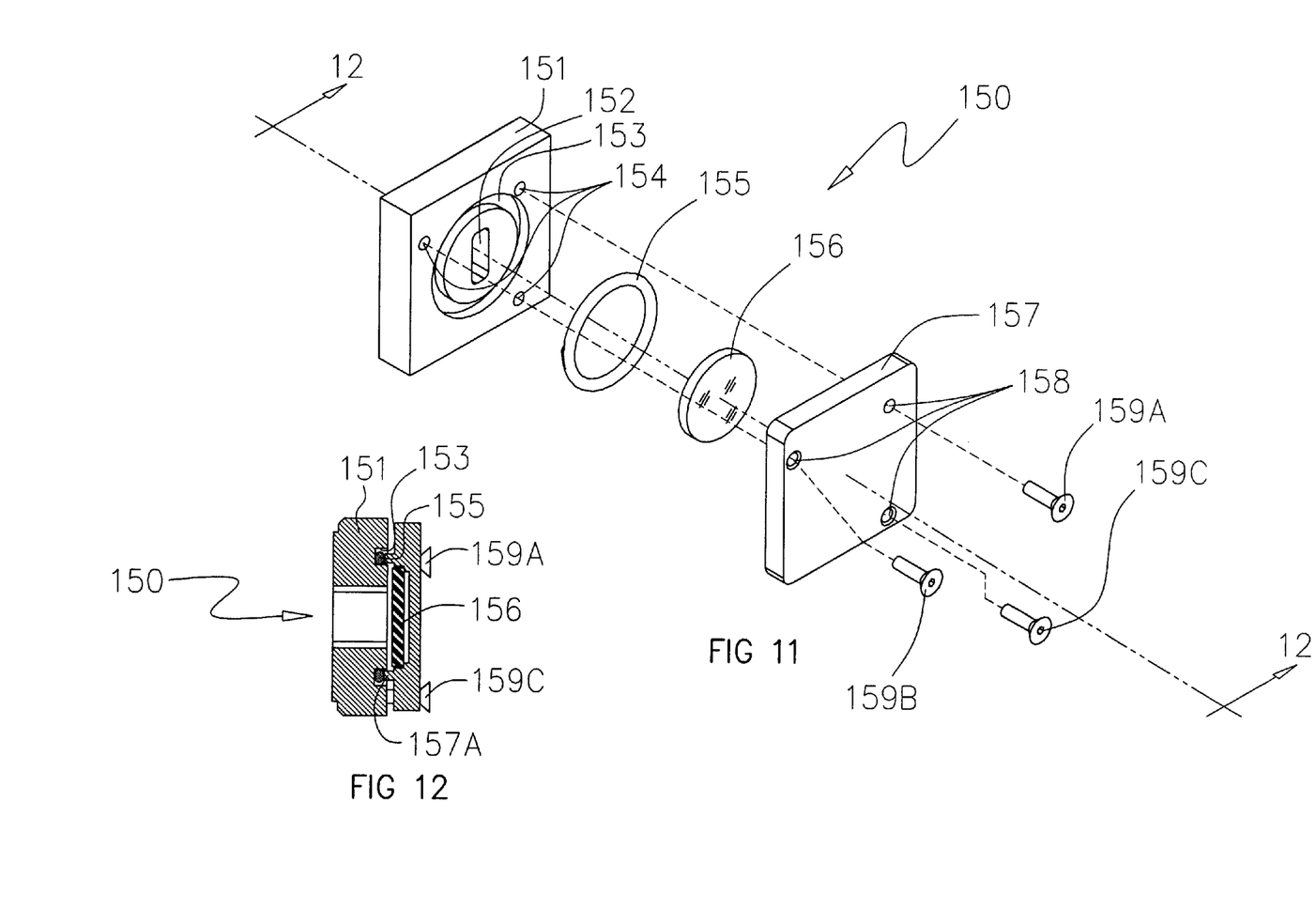
FIG. 11 is an exploded perspective of the rear adjustable mirror assembly of the present invention of FIG. 5.
FIG. 12 is a cross sectional view taken along the lines 12—12 of FIG. 11.

Rear mirror mount sub-assembly 150, as best seen in FIGS. 5,11,12 includes a tube rear end plate 151 which sealingly closes the rear end of tube 111 and has a central aperture 152 conforming generally to gap 40 and, on its outboard side, a rear mirror O-ring recess 153. Rear mirror O-ring 155 is seated in recess 153 and rear mirror bracket 157, carrying mirror 156, also a total reflector, in a recess on the inboard side thereof, is mounted to tube rear end plate 151 causing annular ring 157a to compress O-ring 155 in recess 153 to form a gas tight seal therebetween. (FIG. 12). Bracket 157 is secured to end plate 151 via rear mirror adjustment screws 159a, 159b, 159c inserted through mounting holes 158 in bracket 157 and secured in threaded rear mirror mounting screw holes 154 in bracket 151. The same triangulated mirror adjustment mechanism is operable with respect to rear mirror 156 as was effective for the two mirrors in the front end mount assembly 120. Here, the pivot screw is 159a with screws 159b and 159c being affixed orthogonal thereto respectively in the horizontal and vertical planes to effect, respectively adjustments in the horizontal and vertical planes relative to pivot screw 159a.

D. Laser Tube-Heatsink Sub-assembly

Figures 7, 7A:
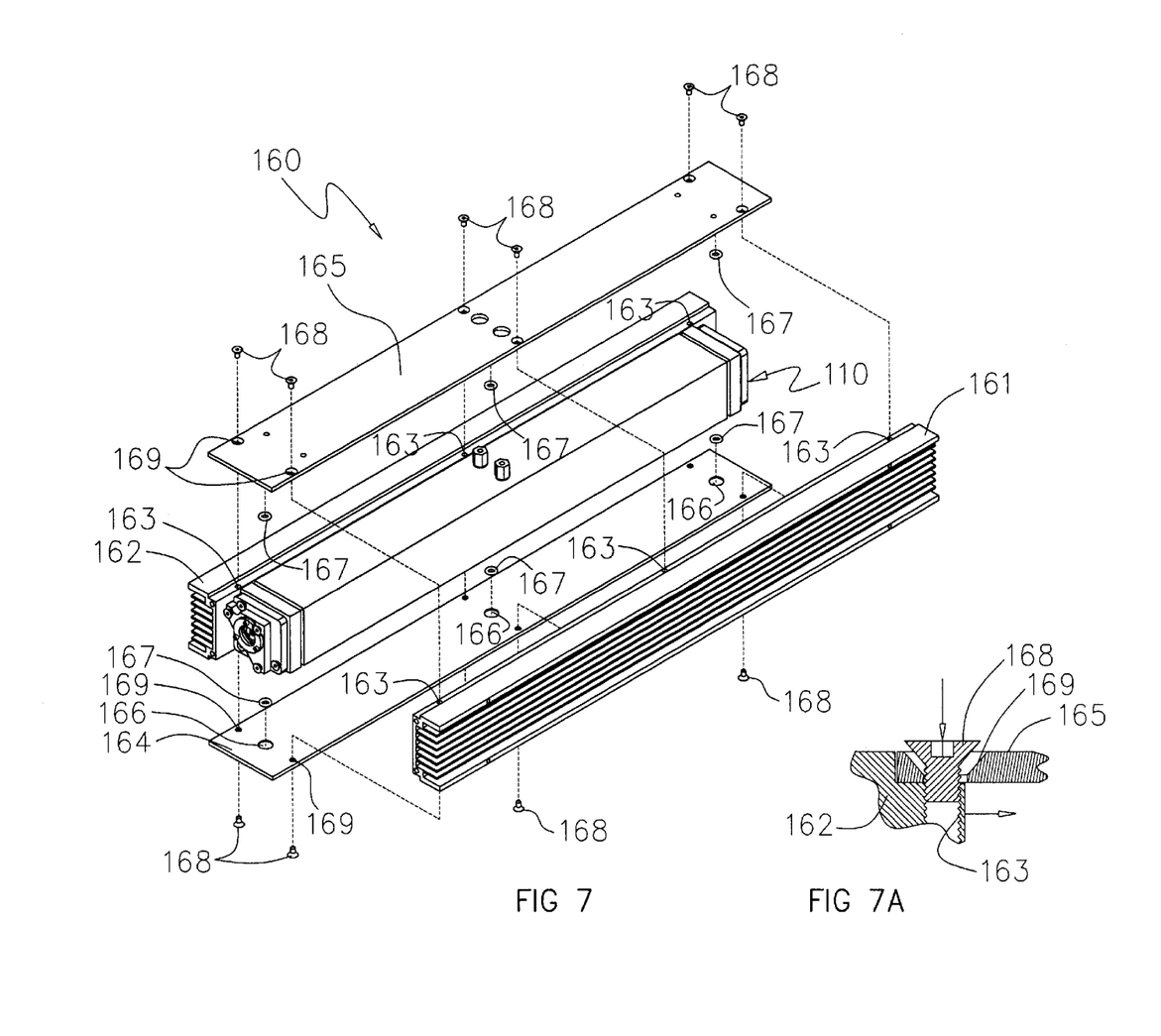
FIG. 7 an exploded perspective view of the laser tube and heatsinks sub-assembly of the present invention.
FIG. 7A is an enlarged cross-sectional view of the countersunk, offset cover plate holes of FIG. 7.

As best seen in FIG. 7, tube and heatsink sub-assembly 160 includes laser tube sub-assembly 110 of FIG. 5 together with heatsinks 161,162, cover plates 164,165, and O-rings 167. Heatsinks 161,162 are positioned laterally of tube assembly 110 and have cover plate mounting holes 163 formed in recesses on the top and bottom inboard edges of the heatsinks 161,162. Top and bottom cover plates 164,165 have a plurality of O-ring recesses 166 respectively on their inner surfaces. As best seen in FIG. 7A, holes 169 in cover plates 164,165 are countersunk and offset slightly inboardly relative to threaded mounting holes 163 in heatsinks 161, 162. Cover plates 164,165 are then secured via cover plate mounting screws 168 inserted through cover plate, countersunk mounting holes 169 and engage into offset threaded mounting holes 163 on the top and bottom edges of heatsinks 161,162. When screws 168 are tightened, they press against the outboard slanted edges of the offset countersunk holes 169 drawing heatsinks 162,163 inwardly firmly against the outboard walls of tube 111 and in good thermal contact therewith, capturing O-rings 167 in recesses 166 and compressing the O-rings against the top and bottom surfaces, respectively, of the outboard surfaces of tube 111 of tube assembly 110.

Accordingly, heatsinks 161,162 and cover plates 164,165 form an integral circumferential structure around laser tube assembly 110 with heatsink 161,162 in good thermal contact with the side surfaces of tube 111, but cover plates 164,165 flexibly spaced from the top and bottom surfaces of tube 111 by compressed O-rings 167.

This mounting and cooling structure is unique and has been found to be especially beneficial in that there is no torsional distortion of the laser tube and cooling fins along the length of the laser tube during operation as was the case with the prior art. In the present invention the heatsinks and cover plates are firmly secured together with the heatsinks firmly held against the sides of the laser, but, at the same time, the top and bottom cover plates being held in spaced relation to the laser top and bottom surfaces of the tube assembly 110, contacting it only through the compressed O-rings 167. Any similar flexible spacer may be used in place of O-ring 167. This structure permits variations in heating and expansion to take place in the tube 111 while minimizing torsional stresses which tend to distort the elongated rectangular shape of the overall assembly and displace the mirrors. At the same time, however, the spacing between tube 111 and the flexibly connected cover plate-heatsink enclosure is small enough such that the heat conductivity from the laser tube assembly 110 through the directly contacting heatsinks 161,162 is more than adequate to assure proper and effective cooling of all components.

E. Final Gas Laser Assembly

Figures 8, 8A:
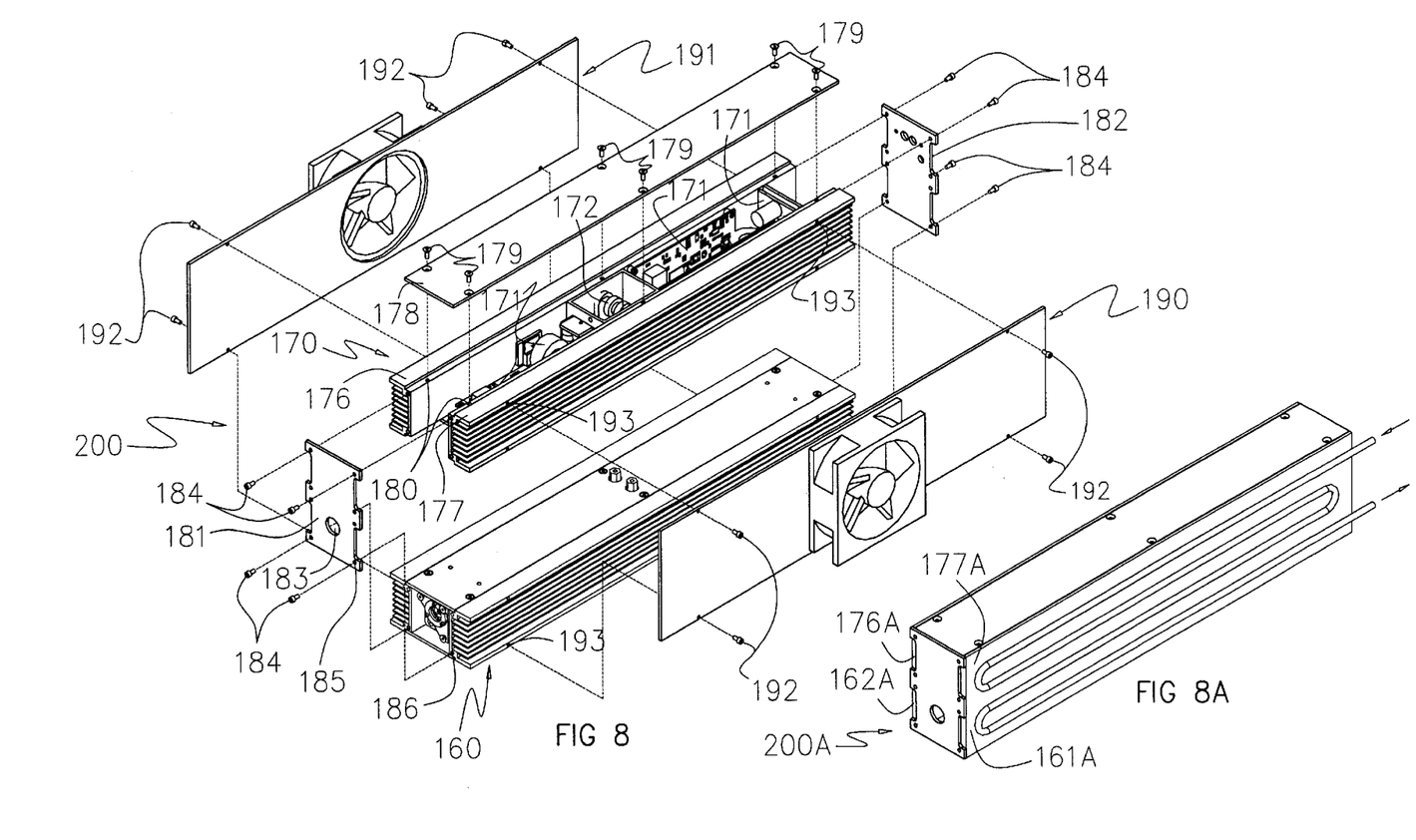
FIG. 8 is an exploded perspective view of the final assembly of the free-space, slab laser of the present invention including heatsinked electronic circuit board and cooling fans.
FIG. 8A is a partial perspective of an alternative embodiment showing water cooled heatsinks.

As best seen in FIG. 8, final gas laser assembly 200 includes the tube and heatsink sub-assembly 160 of FIG. 8, electronics sub-assembly 170, and two fan sub-assemblies 190,191.

Electronics sub-assembly 170 includes several conventional electronics printed circuit boards 171 supporting several discrete devices and additional conventional electronics components, including, but not limited to, an RF generator having a matching impedance network 172 and other control electronics. These components are securely attached together in operative relation and secured between a pair of finned heatsinks 176,177 to form an electronics sub-assembly 170. A cover plate 178 secures to its upper side via cover plate mounting screws 179 through cover plate mounting screw holes 180 in recesses at the upper end of heatsinks 176,177 to form electronics sub-assembly 170. This sub-assembly 170 is secured to tube and heatsink sub-assembly 160 via end plates 181,182 and end plate screws 184 which extend through end plate screw holes 185 and then into threaded holes 186 in the ends of sub-assemblies 160,170. Thus, sub-assemblies 160,170 are locked together by end-plates 181,182. Fan sub-assemblies 190,191 are mounted against the linked heatsinks and secured thereto via mounting screws 192 which screw into threaded mounted screw holes 193 in the side surfaces of the heatsinks 161,162, 176,177. End plate 181 has aperture 183 through which the portion of the laser beam transmitted by the output coupler mirror 141 passes and is allowed to exit the system.

By covering the outsides of the heatsinks with fan sub-assemblies 190,191, the finned heatsinks are effectively made into a plurality of elongated channels through which the air is longitudinally pushed when the fans are activated. The pushed air exits simultaneously from each end of finned heatsinks 161,162,176,177. Heat is effectively removed from the system by this cooling mechanism and all components are maintained in safe thermal operating condition.

As seen in FIG. 8A, an alternative cooling structure would include a water cooled system. Instead of enclosed air channels formed by fins 161,162,176,177 and fan sub-assemblies 190,191 as described above, these structures would be replaced by similar box-like structures 161a,162a containing tubing through which cooled water could be circulated from an external supply which includes a heat exchanger for cooling the water. Water cooled systems have the advantages over air cooled systems of quieter operation by placing the cooling apparatus in a separate room, absence of blowing germ-carrying air enabling a variety of otherwise foreclosed medical applications, and improved temperature control.

Figures 13, 14:
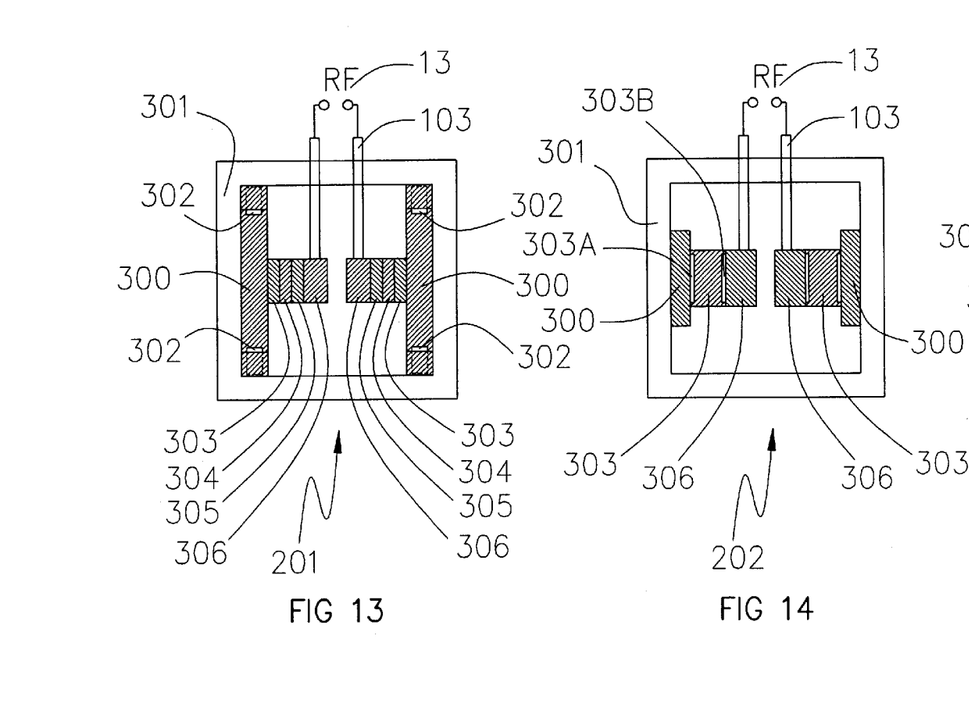
FIG. 13 is a schematic view of a cross section of a first alternative embodiment of a free-space slab laser of the present invention.
FIG. 14 is a schematic view of a cross section of a second alternative embodiment of a free-space slab laser of the present invention.
Figure 15:
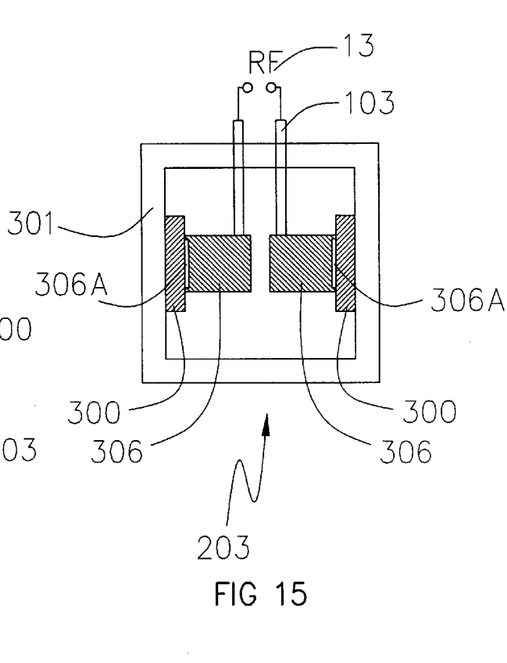
FIG. 15 is a schematic view of a cross section of a third alternative embodiment of a free-space slab laser of the present invention.

FIGS. 13–15 show alternative constructions of the electrode system which may be used as desired. The preferred structure has been already described above.

FIG. 13 shows a pair of elongated base plates 300 secured within housing 301 by set screws 302 at the top and bottom of each of the front and rear ends, respectively, of the base plates. Set screws 302 are tightened by reaching into the end of the tube 301 with an alien wrench during assembly since set screws 302 are located adjacent the outer ends of the electrodes. In this embodiment each base plate 300 has secured thereto by any conventional means a plurality of elongated plates 303,304,305 to the inboard one of which is secured thereto by any conventional means one electrode 306 spaced a predetermined distance from the other electrode 306 similarly secured to the other base plate 300 via other similar plates 305,304,303. Because base plates 300 are in electrical contact with the housing 301 through set screws 302, spacers 303,304,305 are made insulative, such as preferably from anodized aluminum. RF feeds 13 connect via terminals 103 to electrodes 306. This embodiment does not use any mechanism to forcibly spread the electrodes apart to maintain them in a predetermined spaced relation. The use of multiple plates 303,304,305 in series increases thermal conductivity and decreases what would otherwise be an inherent large capacitance.

FIG. 14 presents yet another embodiment of the invention in which similar base plates 300 are secured by conventional means to housing 301 and support electrodes 306 in spaced relation to each other on insulative spacers 303 secured by conventional means to base plates 300 and into which have been milled grooves 303a and 303b on either side. The smaller electrodes and the grooves help to reduce the overall capacitance while maintaining good thermal conductivity.

FIG. 15 is yet another embodiment of the present invention in which larger electrodes 306 are directly conventionally secured to base plates 300 which are conventionally secured to housing 301. Grooves 306a are milled in the outboard side of electrodes 306 to help reduce the capacitance of the larger electrodes. FIGS. 14 and 15 respectively show improved operating characteristics over FIG. 13. However, the optimal configuration is shown in FIG. 6.

F. Working Model

The specifications of a working model are as follows:
a=5.0 mm.
b=15.0 mm
l=444.5 mm
RF power input=300 Watts.
Frequency=40.6 MHZ.
Output power=25–30 Watts.
Wavelength=10.6 microns.
Ambient temperature=25° C.
Air cooled at 200 cfm airflow (100 cfm on each side).
The gas mixture is carbon dioxide, nitrogen and helium in the proportions 1:1:7 and 5% xenon by percent volume with a total pressure between 25–100 torr.

The preferred material for making the tube, the fins and the cover plates is aluminum because of its good thermal conductivity, low cost, and ease of manufacturing.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In a gas slab laser having a pair of parallel, elongated electrically insulated electrodes mounted in a housing and forming a gas discharge area having a rectangular cross section, a laser gas mixture sealed in the housing, an RF feed terminal coupled to each electrode and adapted to couple to a source of RF-excitation, and an arrangement of reflective optical elements mounted to opposite ends of the housing adapted to form a laser resonator operable in the discharge area when RF excitation is applied, wherein the improvement comprises:
a plurality of rigid, deformable support members mounted between the electrodes for maintaining the spatial relationship of the electrodes
wherein each deformable support member comprises:
a ring, and
a screw engaging opposite sides of the ring for compressing the opposite sides in one direction to spread the electrodes in another direction until the electrodes are firmly secured within the housing.

2. The apparatus of claim 1 further comprising:
the support members are adjustable in a direction perpendicular to the long dimension of the rectangular discharge area.

3. In a gas slab laser having a pair of parallel, elongated electrically insulated electrodes mounted in a housing and forming a gas discharge area having a rectangular cross section, a laser gas mixture sealed in the housing, an RF feed terminal coupled to each electrode and adapted to couple to a source of RF-excitation, and an arrangement of reflective optical elements mounted to opposite ends of the housing adapted to form a laser resonator operable in the discharge area when RF excitation is applied, wherein the improvement comprises:
a plurality of rigid, deformable support members mounted between the electrodes for obtaining and maintaining a predetermined spatial relationship between the electrodes,
the two electrodes each having a T-shaped cross section comprising outwardly extending flat flange portions and inwardly extending stem portions terminating in a flat face portion adjacent the discharge area,
a first pair of recesses formed in the inboard side of the outwardly extending flat flange portion of each electrode at one edge portion of each flange and a second pair of recesses formed in the inboard side of the outwardly extending flat flange portion of each electrode at an other edge portion of each flange,
a support member received in each pair of the recesses at the one edge portion of opposite flanges and a support member received in each pair of the recesses at the other edge portion of opposite flanges,
a further pair of recesses in the outboard side of the outwardly extending flat flange portions of each electrode located a predetermined distance from each end of each electrode, each recess of each of the further pairs of recesses being spaced apart from each other a predetermined distance for stabilizing the electrodes within the housing,
a spacer of predetermined thickness received in each recess of the further pairs of recesses, and
the support members being constructed and configured for forcing the electrodes apart outwardly to achieve the predetermined optimal spacing between the electrodes while simultaneously forcing the spacers outwardly against the inboard surface of the housing for establishing the predetermined spacing between the outboard surfaces of the outwardly extending flat flange portions and the inboard surfaces of the housing.

4. The apparatus of claim 3 further comprising:
each recess of the first and second pairs having an inboard ledge portion,
a portion of each support member received on each ledge portion and having a predetermined thickness for establishing a predetermined spacing between the electrodes and the inside walls of the housing in a direction parallel to the long dimension of the discharge area.

5. In a gas slab laser having a pair of parallel, elongated electrically insulated electrodes mounted in a housing and forming a gas discharge area having a rectangular cross section, a laser gas mixture sealed in the housing, an RF feed terminal coupled to each electrode and adapted to couple to a source of RF-excitation, and an arrangement of reflective optical elements mounted to opposite ends of the housing adapted to form a laser resonator operable in the discharge area when RF excitation is applied, wherein the improvement comprises:
a plurality of support members mounted between the electrodes each of which is adjustable to spread apart the electrodes for obtaining and maintaining a predetermined spatial relationship between the electrodes.

6. The apparatus of claim 5 further comprising:
the support members are adjustable in a direction perpendicular to the long dimension of the rectangular discharge area.

7. The apparatus of claim 5 further comprising:
the support members are adjustable following assembly whereby the electrodes may be spread apart slightly until a predetermined gap distance measured along the small dimension of the discharge area is obtained and the spatial relationship of the electrodes is maintained within the housing by compressive forces applied outwardly by the support members of the housing.

8. The apparatus of claim 5 further comprising:
the two electrodes each having a T-shaped cross section comprising outwardly extending flat flange portions and inwardly extending stem portions terminating in a flat face portion adjacent the discharge area,
a first pair of recesses formed in the inboard side of the outwardly extending flat flange portion of each electrode at one edge portion of each flange and a second pair of recesses formed in the inboard side of the outwardly extending flat flange portion of each electrode at an other edge portion of each flange, a support member received in each pair of the recesses at the one edge portion of opposite flanges and a support member received in each pair of the recesses at the other edge portion of opposite flanges, a further pair of recesses in the outboard side of the outwardly extending flat flange portions of each electrode located a predetermined distance from each end of each electrode, each recess of each of the further pairs of recesses being spaced apart from each other a predetermined distance for stabilizing the electrodes within the housing, a spacer of predetermined thickness received in each recess of the further pairs of recesses, and the support members being constructed and configured for forcing the electrodes apart outwardly to achieve the predetermined optimal spacing between the electrodes while simultaneously forcing the spacers outwardly against the inboard surface of the housing for establishing the predetermined spacing between the outboard surfaces of the outwardly extending flat flange portions and the inboard surfaces of the housing.

9. The apparatus of claim 8 further comprising:

each recess of the first and second pairs having an inboard ledge portion, a portion of each support member received on each ledge portion and having a predetermined thickness for establishing a predetermined spacing between the electrodes and the inside walls of the housing in a direction parallel to the long dimension of the discharge area.

10. In a gas slab laser having a pair of parallel, elongated electrically insulated electrodes mounted in a housing and forming a gas discharge area having a rectangular cross section, a laser gas mixture sealed in the housing, an RF feed terminal coupled to each electrode and adapted to couple to a source of RF-excitation, and an arrangement of reflective optical elements mounted to opposite ends of the housing adapted to form a laser resonator operable in the discharge area when RF excitation is applied, wherein the improvement comprises:

a plurality of rigid, extendable support members mounted between the electrodes for obtaining and maintaining a Predetermined spatial relationship between the electrodes, the two electrodes each having a T-shaped cross section comprising outwardly extending flat flange portions and inwardly extending stem portions terminating in a flat face portion adjacent the discharge area, a first pair of recesses formed in the inboard side of the outwardly extending flat flange portion of each electrode at one edge portion of each flange and a second pair of recesses formed in the inboard side of the outwardly extending flat flange portion of each electrode at an other edge portion of each flange, a support member received in each pair of the recesses at the one edge portion of opposite flanges and a support member received in each pair of the recesses at the other edge portion of opposite flanges, a further pair of recesses in the outboard side of the outwardly extending flat flange portions of each electrode located a predetermined distance from each end of each electrode, each recess of each of the further pairs of recesses being spaced apart from each other a predetermined distance for stabilizing the electrodes within the housing, a spacer of predetermined thickness received in each recess of the further pairs of recesses, and the support members being constructed and configured for forcing the electrodes apart outwardly to achieve the predetermined optimal spacing between the electrodes while simultaneously forcing the spacers outwardly against the inboard surface of the housing for establishing the predetermined spacing between the outboard surfaces of the outwardly extending flat flange portions and the inboard surfaces.

11. The apparatus of claim 10 further comprising:

each recess of the first and second pairs having an inboard ledge portion, a portion of each support member received on each ledge portion and having a predetermined thickness for establishing a predetermined spacing between the electrodes and the inside walls of the housing in a direction parallel to the long dimension of the discharge area.

* * * * *